United States Patent
Petelka

(10) Patent No.: US 6,739,811 B1
(45) Date of Patent: May 25, 2004

(54) DECK BEAM AND SUPPORT RAIL

(75) Inventor: Brian W. Petelka, Carlisle (CA)

(73) Assignee: Aero-Kit Industries Inc., Ontario (CA)

( * ) Notice: Subject to any disclaimer, the term of this patent is extended or adjusted under 35 U.S.C. 154(b) by 0 days.

(21) Appl. No.: 10/322,523

(22) Filed: Dec. 19, 2002

(51) Int. Cl.$^7$ .................................................. B60P 7/15
(52) U.S. Cl. ...................... 410/89; 410/143; 410/144; 410/150
(58) Field of Search .......................... 410/89, 132, 139, 410/143, 144, 145, 150, 152; 248/354.1; 211/105.1, 105.3, 162, 191, 192, 208

(56) References Cited

U.S. PATENT DOCUMENTS

| | | | | |
|---|---|---|---|---|
| 4,464,089 A | * | 8/1984 | Allen | 410/97 |
| 4,702,653 A | * | 10/1987 | Gaulding et al. | 410/144 |
| 5,338,137 A | | 8/1994 | Jensen | 410/146 |
| 5,807,047 A | * | 9/1998 | Cox | 410/152 |
| 5,941,667 A | * | 8/1999 | Hardison | 410/146 |
| 6,062,780 A | * | 5/2000 | Petelka | 410/89 |
| 6,068,433 A | * | 5/2000 | Baloga | 410/145 |
| 6,074,143 A | | 6/2000 | Langston et al. | 410/89 |
| 6,364,583 B1 | * | 4/2002 | Koller | 410/89 |

FOREIGN PATENT DOCUMENTS

| | | |
|---|---|---|
| CA | 2236847 | 5/1997 |
| CA | 2234534 | 1/2001 |

* cited by examiner

*Primary Examiner*—Stephen T. Gordon
(74) *Attorney, Agent, or Firm*—Jeffrey L. Costellia; Nixon Peabody LLP

(57) ABSTRACT

There is provided an improved decking assembly including a deck beam and support rail for use in supporting items such as freight in containers, particularly for the purpose of shipping as for example in a highway van trailer. The assembly comprises a pair of elongated tracks, a decking support carriage for each track, and locking means secured to the carriage. The pair of elongated tracks is vertically oriented in opposing relationship to one another. The tracks each have a top surface and a bottom surface, and the top surface has a pair of spaced, inverted, V-shaped grooves with constricted openings, running longitudinally. Each decking support carriage has an outer surface and an inner surface, and spaced, opposing pairs of legs outwardly extending from the inner surface. The pairs of legs form complementary, inverted V-shapes to matingly engage within the grooves on the tracks for secure, guided, sliding movement within the tracks. The locking means is secured to said carriage and is adapted to substantially prevent sliding of said carriage in said track when engaged.

12 Claims, 3 Drawing Sheets

DECK BEAM AND SUPPORT RAIL

FIELD OF THE INVENTION

The invention relates generally to the field of deck beams and supporting rails, and particularly deck beams and supporting rails for use in a compartment.

BACKGROUND OF THE INVENTION

It is often desirable to have a means to support items such as freight within a container, particularly for the purposes of shipping using, for example, a highway van trailer. Where the container is used for a variety of freight, such as when the container is part of or secured to the back of a vehicle, such as a van, it may be advantageous to have a means of readily adjusting the vertical position of deck beams, along the supporting rail, to facilitate efficient loading, and to accommodate freight of differing sizes. Various adjustable decking systems are known in the art, including that disclosed in Canadian Patent 2,234,534, Canadian Patent 2,236,847, U.S. Pat. Nos. 5,338,137, and 6,074,143.

Known adjustable decking systems generally provide vertical support members such as rails, with means to attach horizontal decking supports such as beams, which are adjustable up and down the vertical supports. Such systems tend to employ a track and support connection wherein a vertically aligned connector having a T-shape is received and slidable within a parallely oriented receiver having a C-shape, such that the head of the T is slidable up and down within the C-shaped track. Such a system tends to place considerable strain on the inside edges of the T-C connection, which may cause undesirable wear and eventual looseness or vibration in the connection.

Thus, it is an object of the invention to provide an improved deck beam and support rail.

SUMMARY OF THE INVENTION

In an embodiment of the invention, there is provided a decking assembly for use in supporting freight. The assembly comprises a pair of elongated tracks, a decking support carriage for each track, and locking means secured to the carriage. The pair of elongated tracks is vertically oriented in opposing relationship to one another. The tracks each have a top surface and a bottom surface, and the top surface has a pair of spaced, inverted, V-shaped grooves with constricted openings, running longitudinally. Each decking support carriage has an outer surface and an inner surface, and spaced, opposing pairs of legs outwardly extending from the inner surface. The pairs of legs form complementary, inverted V-shapes to matingly engage within the grooves on the tracks for secure, guided, sliding movement within the tracks. The locking means is secured to said carriage and is adapted to substantially prevent sliding of said carriage in said track when engaged.

BRIEF DESCRIPTION OF THE DRAWINGS

These and other advantages of the invention will become apparent upon reading the following detailed description and upon referring to the drawings in which.

Figure 1:
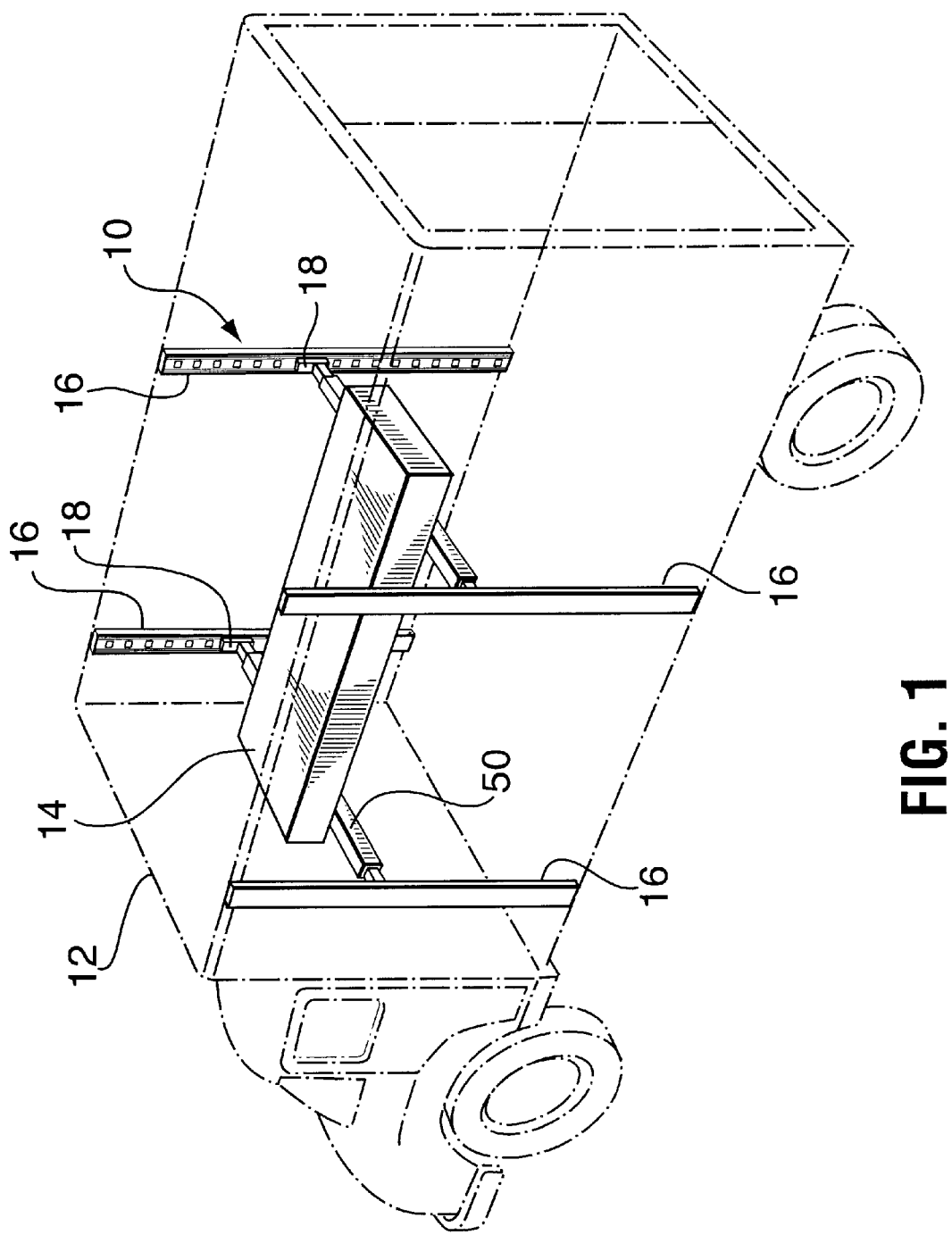
FIG. 1 is a view of an embodiment of the invention, shown in situ within a cargo vessel, and supporting freight.

While the invention will be described in conjunction with the illustrated embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE PREFERRED EMBODIMENTS

In the following description, similar features in the drawings have been given similar reference numerals.

FIG. 1 depicts a decking assembly 10 shown installed in a container 12 supporting freight 14. As shown in greater detail in FIGS. 2, 3 and 4, the decking assembly 10 comprises a pair of substantially opposed elongate tracks 16 engaging a decking support carriage 18 for each track 16. The track 16 is adapted to be vertically secured, such as on the wall of the container 12, in opposed orientation to a substantially identical track on the opposing wall. Each track has a top surface 20 and a bottom surface 21 (best seen in FIG. 4). The bottom surface 21 is preferably adapted to be secured to, for example, a wall of container 12. The top surface 20 of the track 16 defines a pair of spaced, inverted V-shaped grooves 22 with constricted openings 24. The bottom 26 of each groove 22 may include a protrusion 28 extending substantially parallel to the length of the groove 22 along its bottom. The grooves 22 are inwardly angled.

Figure 3:
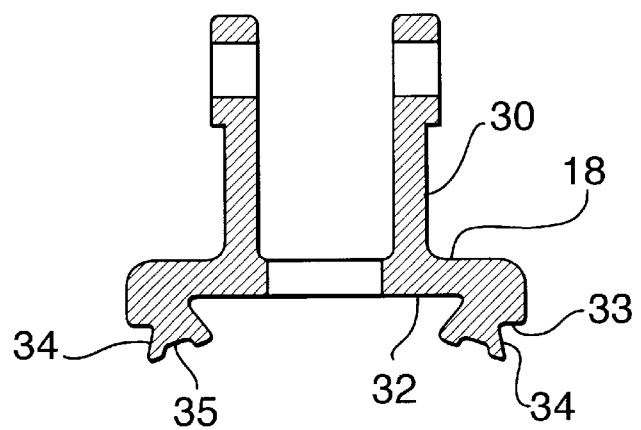
FIG. 3 is a cross-sectional view of an embodiment of a decking support carriage of the present invention.
Figure 4:
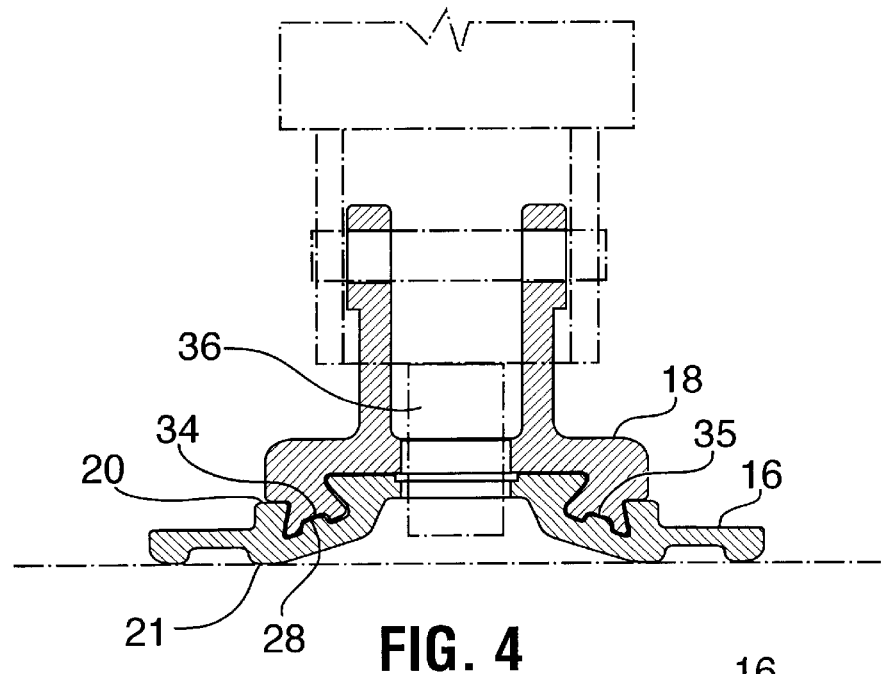
FIG. 4 is a cross-sectional view of the elongate track of FIG. 2 engaging the decking support carriage of FIG. 3, wherein the decking support carriage is shown in association with a portion of a horizontal support and a locking means, both shown in ghost.

The decking support carriage 18 has an outer surface 30 and an inner surface 32 (FIG. 3). The inner surface 32 defines a pair of opposing spaced apart legs 34, the pair of legs forming complementary inverted V-shapes to matingly engage within the grooves 22 on the track 16. The carriage 18 inner surface 32 is preferably substantially planar other than the legs 34 which are preferably continuous along opposite portions of the inner surface 32 of the carriage 18. The inner surface 32 of the carriage 18 is preferably constructed so as to slidably engage the top surface 20 of the track 16 during operation of the decking assembly 10. In some instances it will be desirable for the inner surface 32 of the carriage 18 and the top surface 20 of the track 16 to confront each other and be substantially planar, as shown more particularly in FIG. 4. In some instances it will be desirable for portions 33 of the inner surface 32 beyond the legs 34 to be substantially planar and parallel to the inner surface 32 between the legs 34 but offset from it, as shown in FIGS. 3 and 4.

While the figures depict the tracks 16 secured to the walls of a container 12 it will be readily appreciated that all suitable means for maintaining the tracks 16 in a vertical orientation are contemplated.

Figure 2:
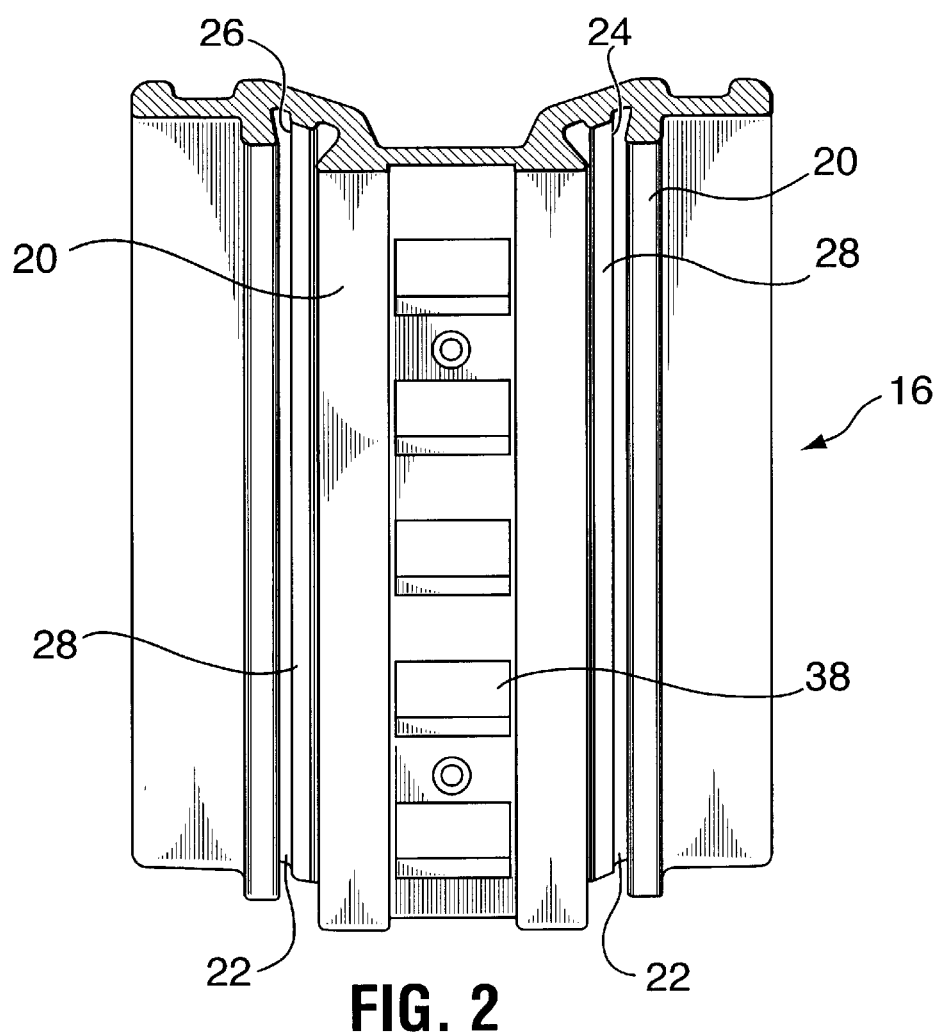
FIG. 2 is a perspective view from above in partial section of a portion of an embodiment of an elongate track of the present invention.
Figure 5:
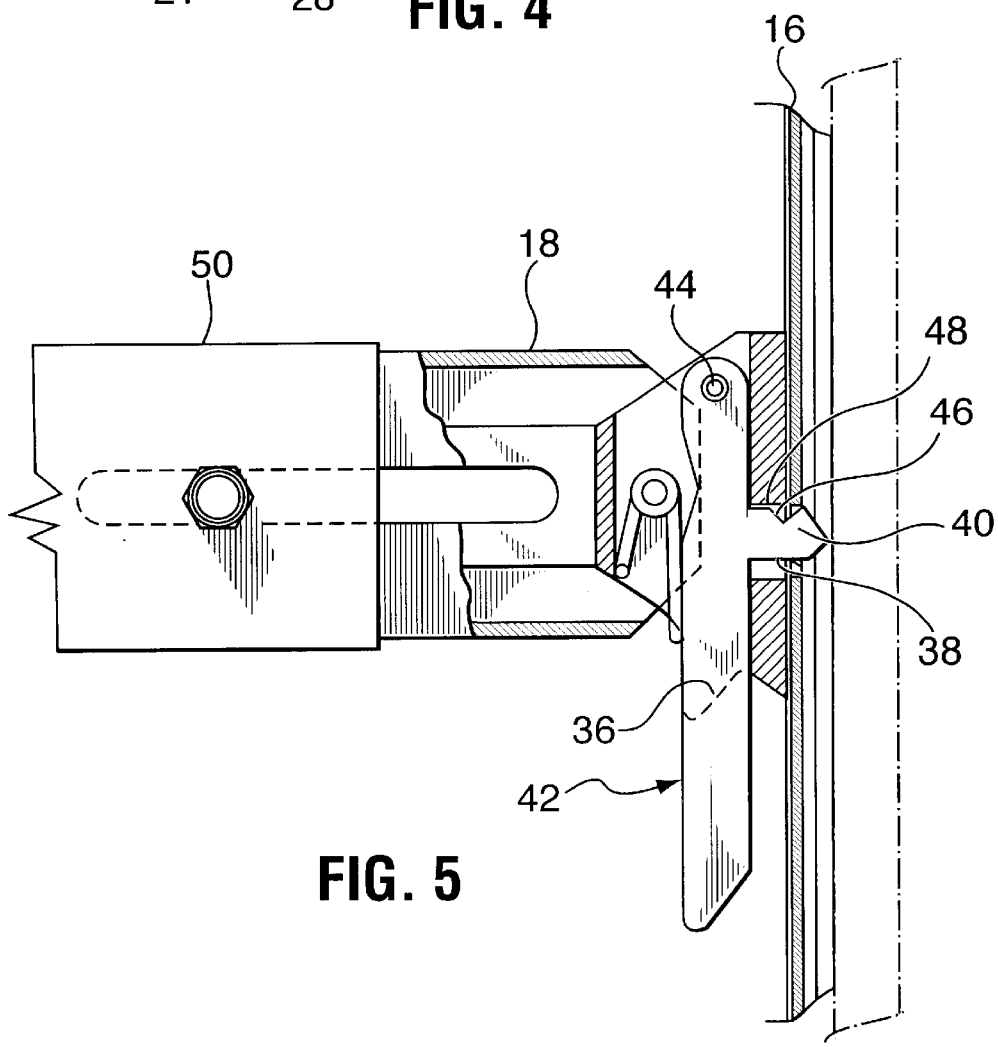
FIG. 5 is a side view in partial section of the embodiment of FIG. 4, with a portion of the decking support carriage and locking means shown in break-away view.

FIG. 5 depicts an embodiment of the decking assembly 10 including a locking means 36 adapted to engage locking receivers 38 along the track 16. As shown in FIG. 2, the locking receivers 38 may comprise indents or holes in the track adapted to receive a projection 40 from the locking means 36. In some instances the locking means 36 comprises a lever 42 pivotally connected to the carriage 18 at a pivot point 44. Projection 40 is fixedly secured to the lever 42 at a location part way along the length of the lever 42, as shown in FIG. 5. The projection 40 is locked in place within one of the locking receivers 38 by means of a step 46 in the vertically leading edge 48 of the projection 40. The step 46 is preferably oriented at right angles to the center line of the pivot point 44 of the lever 42 to the carriage 18.

In operation, the legs 34 of the carriage 18 are inserted in the grooves 22 of the track 16. A pair of opposing tracks 16 receive a pair of carriages 18. The horizontal surface between the carriages 18 is spanned by a horizontal member 50, which may be a beam, or may be freight itself, adapted to be supported directly by the outer surface 30 of the carriage 18.

When freight 14 is to be supported, the weight of the freight 14 is transferred to the carriage 18. The carriage 18 maintains the freight 14 in the desired position through the application of force on the inner surface of the grooves 22 of the track 16. The V-shape of the grooves 22 means that force is applied on the outside surfaces of the legs 34. The application of force to the outer surfaces of the inverted V-shaped legs 34 will tend to stabilize the carriage 18 in the track 16, thereby providing, when locked in position, a secure support for freight 14.

The mating of the protrusion 28 located in the bottom 26 of the groove 22 with an elongate notch 35 in the leg 34 of the carriage, provides even further support for the assembly 10, and assists in maintaining the legs 34 in the grooves 22, and reducing vibration, both when locked in position and when being moved from one horizontal position to another.

Thus, it is apparent that there has been provided in accordance with the invention a deck beam and support rail that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

We claim:

1. A decking assembly for use in supporting freight, said assembly comprising:
    (a) a pair of elongated tracks to be vertically oriented in opposing relationship to one another, said tracks each having a top surface and a bottom surface, the top surface having a pair of spaced, inverted, V-shaped grooves with constricted openings, running longitudinally;
    (b) a decking support carriage for each track, each carriage having an outer surface and an inner surface, and a spaced, opposing pair of legs outwardly extending from the inner surface, said pair of legs forming complementary, inverted V-shapes to matingly engage within the grooves on the tracks for secure, guided, sliding movement within the tracks; and,
    (c) a locking means secured to said carriage and adapted to substantially prevent sliding of said carriage in a respective one of said tracks when engaged.

2. The assembly of claim 1 wherein the carriage has a substantially planar body and the legs are continuous along opposite portions of the inner surface so as to be adapted to travel in said grooves.

3. The assembly of claim 1 wherein said grooves are inwardly angled.

4. The assembly of claim 1 further including an elongated notch in each leg bottom and a corresponding mating protrusion on each groove bottom in each track.

5. The assembly of claim 1 wherein the inner surface of said carriage is constructed so as to slidably engage the top surface of the track during operation of the assembly.

6. The assembly of claim 5 wherein portions of the inner surface of said carriage and the top surface of said track confront each other and are substantially planar.

7. A decking assembly for use in supporting freight in a compartment having opposing walls, said assembly comprising:
    (a) a pair of elongated tracks for vertical mounting on opposing walls of the compartment in opposing relationship to one another, said tracks each having a top surface and a bottom surface, the top surface having a pair of spaced, inverted, V-shaped grooves with constricted openings, running longitudinally;
    (b) a decking support carriage for each track, each carriage having an outer surface and an inner surface, and a spaced, opposing pair of legs outwardly extending from the inner surface, said pair of legs forming complementary, inverted V-shapes to matingly engage within the grooves on the tracks for secure, guided, sliding movement within the tracks; and,
    (c) a locking means secured to said carriage and adapted to substantially prevent sliding of said carriage in a respective one of said tracks when engaged.

8. The assembly of claim 7 wherein the carriage inner surface is a substantially planar body other than the legs and the legs are continuous along opposite portions of the inner surface so as to be adapted to travel in said grooves.

9. The assembly of claim 7 wherein said grooves are inwardly angled.

10. The assembly of claim 7 further including an elongated notch in each leg bottom and a corresponding mating protrusion on each groove bottom in each track.

11. The assembly of claim 7 wherein the inner surface of said carriage is constructed so as to slidably engage the top surface of the track during operation of the assembly.

12. The assembly of claim 11 wherein portions of the inner surface of said carriage and the top surface of said track confront each other and are substantially planar.

* * * * *